REFLEX THERMOMAGNETIC RECORDING PROCESS

Filed Feb. 4, 1969 2 Sheets-Sheet 1

Jan. 12, 1971 G. R. NACCI 3,555,557

REFLEX THERMOMAGNETIC RECORDING PROCESS

Filed Feb. 4, 1969 2 Sheets-Sheet 2

United States Patent Office 3,555,557
Patented Jan. 12, 1971

3,555,557
REFLEX THERMOMAGNETIC RECORDING PROCESS

George Raymond Nacci, Fairfax, Wilmington, Del., assignor to E. I. du Pont de Nemours and Company, Wilmington, Del., a corporation of Delaware Continuation-in-part of abandonded applications Ser. No. 410,007, Nov. 9, 1964; Ser. No. 636,728, May 8, 1967; and Ser. No. 682,234, Nov. 13, 1967. Continuation-in-part of application Ser. No. 636,955, May 8, 1967. This application Feb. 4, 1969, Ser. No. 796,490
Int. Cl. G01d *15/06, 15/08, 15/12*
U.S. Cl. 346—74 16 Claims

ABSTRACT OF THE DISCLOSURE

A process for thermomagnetic copying of documents using a semitransparent recording member containing a magnetic stratum which is premagnetized and placed in imaging relationship to the document. The assembly is exposed to light which passes through the recording member and is selectively reflected from the document so that the magnetic stratum is imagewise demagnetized.

RELATED APPLICATIONS

This application is a continuation-in-part of application Ser. No. 682,234, filed Nov. 13, 1967, now abandoned, which is a continuation-in-part of Ser. No. 636,728, filed May 8, 1967, now abandoned, and of Ser. No. 410,007, filed Nov. 9, 1964, now abandoned. This application is also a continuation-in-part of Ser. No. 636,955, filed May 8, 1967, which is a continuation-in-part of Ser. No. 410,007, filed Nov. 9, 1964.

FIELD OF THE INVENTION

This invention relates to a new method of recording information contained on documents and to copying the documents. More particularly, this invention relates to a method of recording and copying documents by reflex thermal demagnetization of premagnetized recording members.

Sims, U.S. 2,793,135 has described a method for making magnetic printing plates by passing heating radiation through a suitable transparency or document and thus imagewise demagnetizing a premagnetized recording member.

Burns, U.S. 2,915,594 and Wilferth, U.S. 3,250,636 have also described methods of thermomagnetic imaging on magnetic recording members.

SUMMARY OF THE INVENTION

The process of the present invention can be defined as a process of reflex thermomagnetic recording which comprises:

(i) Placing a document to be copied in copying relationship with a premagnetized magnetic recording member, said magnetic recording member comprising a stratum of a particulate hard magnetic material capable of being magnetized to a hard magnetic state bound to a support, the support being transparent to light, the particles of said pariculate hard magnetic material having a maximum dimension in the range of from 0.01 to 10 microns. Preferably, the hard magnetic material is chromium dioxide and most preferably acicular chromium dioxide. The magnetic material is disposed in the stratum to provide a transmission to light of from 5 to 95%.

(ii) Directing light through said recording member to said document and back to said recording member by imagewise reflection from said document to expose said magnetic material to said light for a time less than 10 milliseconds, said light having an intensity sufficient to imagewise raise the temperature of said magnetic material above the lower temperature limit of the Curie range of temperature while the remainder of said magnetic recording member is maintained at a temperature below the lower temperature limit of the Curie temperature range; and (iii) Cooling the magnetic material below the lower temperature limit of the Curie range of temperature and thereby fixing a magnetic image on the recording member.

It is necessary that the recording member is magnetized prior to exposure. This is readily accomplished by magnetizing the member prior to placing the document in copying relationship with the member. However, the document can also be placed in copying relationship with the magnetic recording member which is then magnetized prior to exposure. Thus, in general, all that is necessary is that the light be directed through the magnetized recording member to the document and reflected back from the document to imagewise demagnetize the member under the above conditions.

The magnetic image of the document formed on the recording member is fixed until erased by remagnetization or demagnetization of the entire recording member. The fixed image can be read out repeatedly by such means as magneto-optic read-out utilizing the Kerr effect, magnetic heads, and the like. The preferred method of reading out the magnetic image is by treating the recording member with a magnetic ink or a magnetic toner containing magnetic particles which adhere magnetically to the magnetized portions of the recording member, a process which is conveniently called decoration of the recording member, and then transferring the magnetic ink or magnetic toner to paper or the like to form a copy of the original document.

THE DRAWINGS

The process of the present invention will be better understood by reference to the accompanying drawings. In these drawings.

Figure 1:
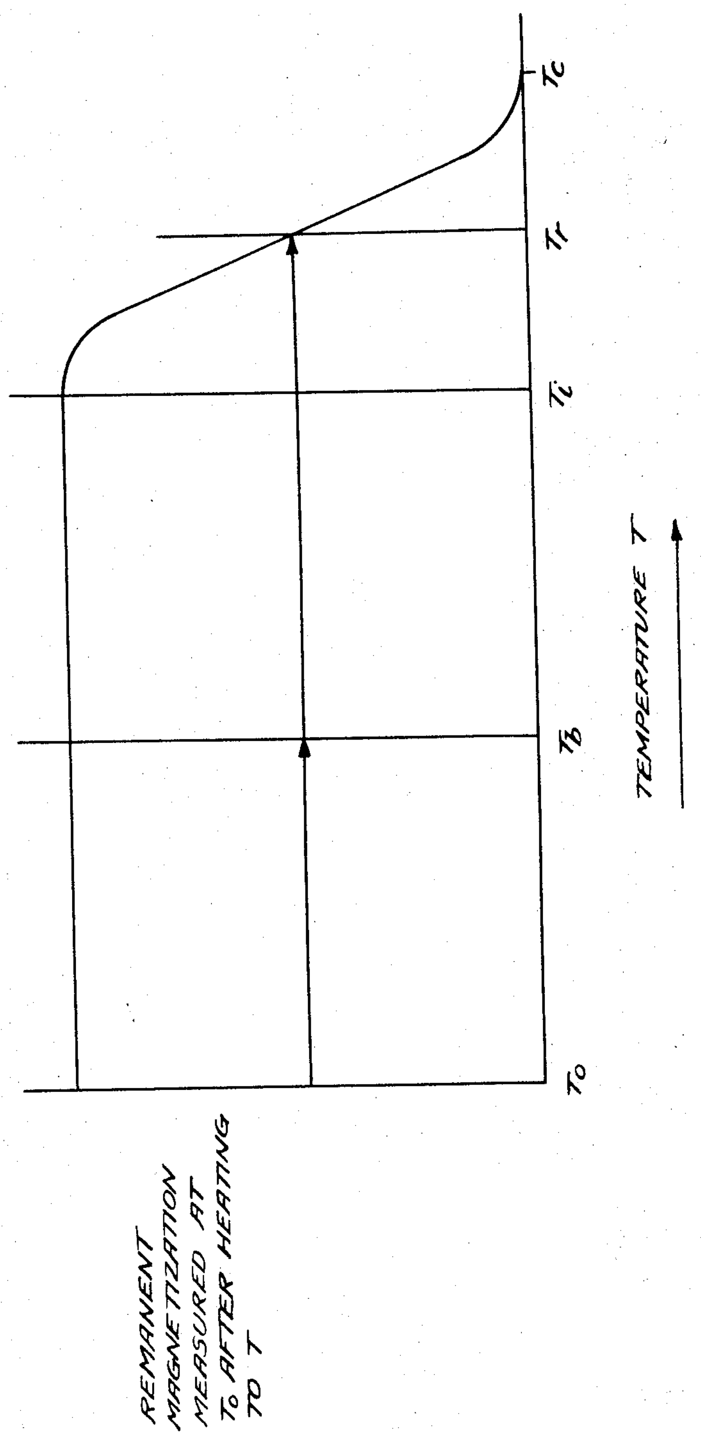
FIG. 1 is a graph showing the remanent magnetization $M_r$ of a magnetized magnetic material, measured at $T_0$, the base temperature, after heating to temperature T and then cooling to $T_0$.

Referring now to FIG. 1, it will be seen that on heating a magnetized material to some temperature T above the initial temperature $T_0$ (which can be room temperature or some temperature higher or lower than room temperature) and then cooling back to $T_0$, substantially no change in the magnetization occurs so long as T is below $T_i$, the lower temperature limit of the Curie point range. When T is in the Curie range of temperature, between $T_i$ and $T_c$, the Curie temperature, the remanent magnetization decreases, and when T is above $T_c$ the magnetic material is demagnetized.

In the process of the present invention, the light initially passes through the magnetic recording member and is partially absorbed by the magnetic material, which is raised to a temperature $T_b$. The temperature $T_b$ can be regarded as an instantaneous bias temperature. The support is transparent to the exposing light, and accordingly is not substantially heated in this process. The light which passes through the partially transparent recording member is selectively reflected by the document and further heats the magnetic material of the recording member to a temperature $T_r$. If $T_r$ is below $T_i$, i.e., little light is reflected, the magnetization of the recording member is unchanged. If $T_r$ is between $T_i$ and $T_c$, as shown in FIG. 1, the magnetic material thus exposed is partially demagnetized. If $T_r$ is above $T_c$, then the magnetic material is completely demagnetized.

The magnetic material must be heated by brief exposure to the exposing light in order to avoid diffusion of the heat image. Desirably, this exposure should be less than 10 milliseconds. It is equally important that the magnetic material which is heated above $T_i$ be cooled quickly to avoid diffusion of the image. Although the effective initial temperature for the imaging step is $T_b$, the temperature of the support to which the magnetic material is bound is $T_0$. Thus a substantial thermal gradient is maintained, regardless of the value of $T_b$, which provides for extremely rapid cooling of the particulate magnetic material.

When the bias temperature $T_b$ is approximately the same as $T_i$ and the reflected light from the document is such that adjacent to the white areas the heating effect of the light is sufficient to raise the temperature of the magnetic material $T_c$, the system will effectively copy gray-scale, i.e., the demagnetization of the recording member will be substantially proportional to the reflectivity of the document placed in copying or imaging relationship with it.

On the other hand, when $T_b$ is decreased below $T_i$, the contrast of the image, which is the opposite of gray scale is increased. The contrast is roughly proportional to $$\frac{T_c - T_b}{T_c - T_i}$$

As $T_b$ decreases, the contrast increases, that is, smaller and smaller differences in reflectivity from the background will effectively demagnetize the contiguous areas of the recording members.

The bias temperature $T_b$ can be adjusted relative to $T_i$ by design of the recording member. Thus if the proportion of magnetic material covering the surface of the recording member is increased to decrease the transmission to light of the recording member, the proportion of light available for reflection from the document is decreased, and $T_b$ is effectively increased when the intensity of light is sufficient for imaging.

The bias temperature can be decreased by placing a reflective coating between the magnetic material and the source of light while maintaining the transmission of the regions of the recording which are not covered with magnetic material.

The contrast of the system can also be increased by choice of a magnetic material in which $T_c - T_i$ is smaller, other things being equal.

Figure 2:
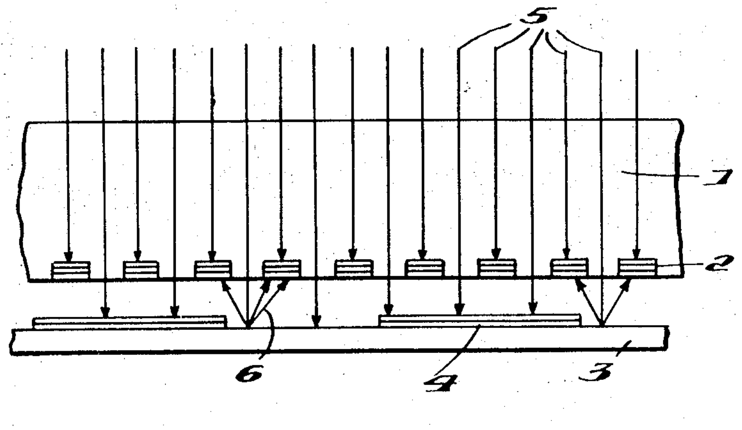
FIG. 2 shows a cross section, greatly enlarged of a preferred form of copying member in contact with a document during the process of irradiation with light.

FIG. 2 shows a cross section, greatly enlarged, of a preferred copying member in contact with a document during the process of irradiation. The transparent support of the copying member 1 has a series of parallel grooves 2, shown in section, which are filled with hard magnetic particles cemented to each other and to the support with a binder. The magnetic elements are magnetized. The document 3 containing areas of low reflectivity 4 is placed substantially in contact with the copying member. Incident radiation 5 passes through the copying member between the filled areas to the document. The incident radiation thermally biases the magnetic elements of the copying member to a temperature towards the Curie point. Radiation reflected selectively by the more reflective parts of the document raises the temperature of the adjacent elements of the copying member above the Curie point and thus selectively demagnetizes the copying member to form a magnetic image reproducing the less reflective areas of the document.

Figure 3:
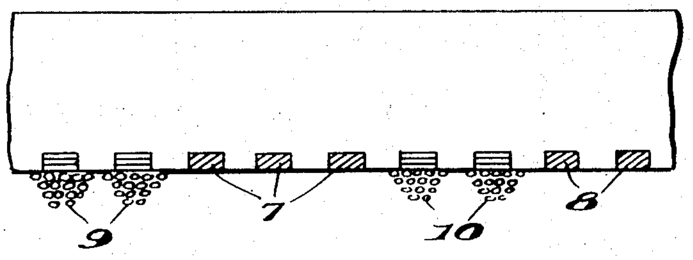
FIG. 3 shows a cross section, greatly enlarged, of the copying member of FIG. 2 after irradiation with light, removal of the document and decoration with toner particles.

FIG. 3 shows the magnetic recording member after removal of the document and treatment with a toner containing ferromagnetic particles. Areas corresponding to the more reflective elements of the document 7 and 8 are demagnetized and do not attract the toner particles. The magnetized areas 9 and 10 attract the toner particles thus rendering the magnetic image visible. By pressing the copying member on paper or the like the toner particles can be transferred to the paper and fused to the paper by heat, thus forming a copy of the document.

Figure 4:
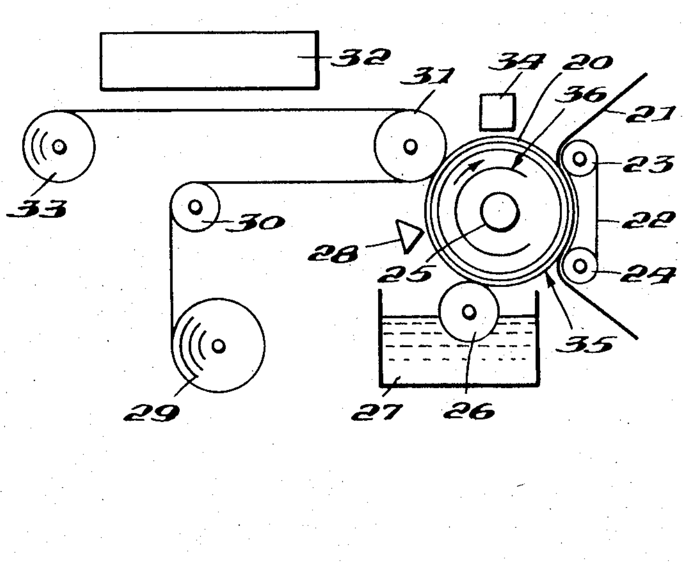
FIG. 4 shows a schematic view of an apparatus which can be employed for the reproduction of documents employing the process of the present invention.

FIG. 4 shows a schematic view of an apparatus which can be used for the thermomagnetic reproduction of documents. In this drawing, the magnetized thermomagnetic copying member in the form of a film 35 is placed over the surface of a transparent drum 20 which is driven in the direction indicated in the arrow. The document which is to be copied, 21, is fed through the machine in stationary relationship with the copying member by friction applied by the flexible belt 22 which holds the document in contact with the copying member and moves synchronously therewith over the idling rollers 23 and 24. At the center of drum 20 is positioned a xenon lamp 25 which emits flashes of light at high intensity, and having a duration of the order of a millisecond over the surface of the member in contact with the document as defined by the stationary mask or shield 36. Each flash forms a magnetic image of the document on the copying member as described elsewhere in this specification. The copying member returns to substantially its initial thermal state in about 0.5 second, and the flashes are spaced in time at somewhat longer intervals. The speed of document feed and drum rotation is maintained so that each portion of the document is exposed to the radiation at least once while in contact with the copy member.

The magnetic image can then be developed by padding on a toner, containing ferromagnetic particles with a fusible binder on the surface of the particles, by the padding roll 26 which dips in a bath 27 containing the toner slurry. Surplus toner is removed by the wiping means 28. The image is then transferred to paper which is fed from a roll 29, passing over the idling roll 30 and thence in contact with the recording member by the pressure roll 31, when the image is transferred. The toner particles are then fused to the copying paper by a bank or heaters 32, and the paper is removed on the roll 33.

Once the document has passed through the machine forming the magnetic image, a large number of copies can be made by continued rotation of drum 20, since the image is substantially permanent. The image can be destroyed and the magnetic recording member returned to its uniformly magnetized state ready to copy further documents by operation of the magnetic head 34.

In the above apparatus, a separate recording member placed on the surface of a transparent rotating drum has been described. It will be evident that the magnetic elements forming the recording member can be attached directly to the drum rather than to a flexible substrate member. Further, it will be apparent that a transparent flexible support, generally of a polymeric material, can be submitted for the drum. The support can itself be the substrate of a recording member or a separate flexible recording member can be placed on part or over all of the surface of the support.

The support can assume any convenient form, and can be flexible or rigid. The support can, for example, be in the form of an endless belt which is driven past the magnetizing means, recording means and optionally the toning and printing means or other read out. On the other hand, the support can be essentially flat and the recording member attached thereto and driven through the various treating means by a reciprocating mechanism.

In some instances, it may be desired to form recording members containing a magnetized image, which can then be removed and stored or shipped elsewhere and viewed directly by magneto-optic or other means as described elsewhere in this specification or employed as a printing plate for printing with magnetic toners or the like. The apparatus described above can be employed to form such members except that the toning and printing means may be eliminated.

DETAILED DESCRIPTION OF THE INVENTION

The term document is used throughout this specification and claims to mean any instrument capable of conveying information by a reflectivity gradient to light. More specifically, the term document is inclusive of any writing, book, halftone, line screen, photograph, transparency, typewritten sheets, printed matter, etc. In general documents can be read with the naked eye, i.e., they selectively reflect visible light. Faithful reproduction of such documents by forming a magnetic image on a recording member requires the use of visible light as the exposing radiation. However, light can also include the region of the electromagnetic spectrum adjacent to the visible region of the spectrum, namely, the infrared and ultraviolet regions of the spectrum. The term "light" is therefore employed in the specification and claims to mean visible light and infrared or ultraviolet radiation adjacent to the visible region of the electromagnetic spectrum.

The light is employed to cycle the magnetic material briefly above the lower temperature limit of the Curie range of temperature in those regions of the magnetic recording member which correspond with areas of greater reflectivity. The light should be applied as a brief pulse or flash in order to minimize thermal diffusion. The duration of the exposure should be less than 10 milliseconds and generally from 0.1 to 10 milliseconds in duration, although shorter exposures can be usefully employed. The use of a brief pulse or flash of light also minimizes the energy required for adequate exposure.

It will be appreciated that the process of the present invention is not cumulative. Exposure to identical pulses of radiation does not vary the final magnetic state of the magnetic material provided sufficient time elapses between successive exposures for the magnetic material to resume substantially its initial state of temperature. This time is of the order of 0.5 second.

In view of these considerations, the document and recording member can be exposed to a single flash of radiation from a flash lamp which provides substantially uniform illumination over the surface of the document. Alternatively, areas of the document and recording members which overlap can be exposed to successive flashes from a flash lamp to provide an image of the whole document. A continuous point source of light, such as the focussed beam of a laser, can be scanned in the form of a raster over the assembled document and recording member or a continuous beam of light in the form of a line can be scanned over the assembled document and magnetic recording member.

A preferred flash lamp for use in the process of the present invention is the xenon flash lamp.

Approximately 50% of the energy of the xenon flash lamps is in the visible, the other 50% is in the infrared. In copying light, noninfrared absorbing colors, it is desirable to use filters removing a portion of the infrared energy from the flash so that the material copied corresponds more nearly to the spectral sensitivity of the human eye. Corning infrared filter 1–59 containing iron in the ferrous state can be used to copy a wide variety of colors and colored images on white or colored papers. It permits copying such difficult colors as yellow pencil on white paper, a variety of ball point pen inks, and many other images of low contrast which are otherwise difficult to copy. Further improvements in color copying can be obtained by using filters which peak the output of the xenon flash in a particular region of the visible spectrum.

The magnetic material must be capable of magnetization such that it exhibits an energy product $(BH)_{max}$ of 0.08–8.0 gauss oersteds$\times 10^6$, a remanence $B_r$ of 500–21,500 gauss, a coercivity $_iH_c$ of 40–6000 oersteds, and a Curie-point temperature of from approaching 0° K. to 1150° C., preferably from 25° C. to 500° C. Desirably the magnetizable material should also have as high a saturation magnetization and remanence, i.e., $B_s$ and $B_r$, respectively, as possible, consonant with the just recited desirable property range.

A particularly outstanding species of the magnetic material which can be used in making the recording members for use in the present invention is chromium dioxide ($CrO_2$). This material can be used in substantially pure form, or modified with one or more reactive elements. The term chromium dioxide as used in this application is specifically inclusive of the pure form and the modified forms. Suitable descriptions of both the process of preparation and the compositions which have the necessary properties will be found in the following illustrative list of issued U.S. patents: Arthur U.S. 2,956,955; Arthur & Ingraham U.S. 3,117,093; Cox U.S. 3,074,778; U.S. 3,078,147, U.S. 3,278,263; Ingraham and Swoboda U.S. 2,923,683; U.S. 2,923,684; U.S. 3,034,988; U.S. 3,068,-176 and Swoboda U.S. 2,923,685. For pure $CrO_2$ the Curie temperature is near 119° C. This varies somewhat depending on the modifiers used in the synthesis of $CrO_2$, but Curie temperatures in the range of 70° C.–170° C. are easily attainable with modified $CrO_2$. This range of temperature is conveniently accessible and forms a preferred temperature range.

Chromium dioxide has a relatively low Curie temperature, and when in the desired particulate form has a relatively high coercivity and relatively high remanence. Finely particulate chromium dioxide further absorbs light uniformly throughout the region of the visible spectrum, i.e., it is black to the exposing light.

Other magnetic materials which can be employed include chi-iron carbide and $\gamma Fe_2O_3$.

Desirably, the material capable of magnetization to the hard, magnetic state will be of particle size of one micron or under, although particles having a maximum dimension as large as 10 microns such as the chromium dioxide particles described by Arthur in U.S. Pat. 2,956,955 can be used. Such particles tend to agglomerate and, accordingly, any one magnetizable area will have agglomerates having a maximum dimension up to 10 mils. In recording and copying techniques, the resolution is a function of the particle size of the working component involved. The smallest unit which can be charged magnetically is a domain, and in small particles the size of the domains is limited by the particle size. Accordingly, the smaller and more uniform the particle size of the material to be magnetized, the better. Preferably, these particles should have a maximum dimension in the range 0.01 to 5 microns, and most especially 0.1 to 2.0 microns. The particulate nature of the magnetic material also serves to limit the spread of the heat image by thermal diffusion, particularly when the particles are bound together and to the support with a binder of relatively low thermal conductivity.

The recording member consists of the above-described magnetic material dispersed in a stratum on a support to impart the necessary degree of transparency.

The nature of the support in and/or on which the magnetizable stratum is positioned can vary widely through such a range as from glass to flexible polymers. Many suitable materials are included in the binding materials which are described hereinafter. Because of the ease of handling, the preferred substrates are the flexible polymeric ones. The prime property for the substrate is that it be transparent to the light used to effect the imagewise demagnetization. Preferably, it should be of low heat conductivity.

The thickness of flexible substrates is generally in the range of 0.1 to 10 mils. The most usual thicknesses are in the range 0.2 to 5.0 mils and especially preferred are thicknesses in the range of 0.5 to 2 mils.

The magnetic material must be disposed in a stratum to provide the necessary transparency in the copy member.

The recording member must have finite percentage transmission characteristics. Normally, the percent transmission of the copying member with its allied magnetic stratum, and/or binder if necessary, will lie in the range 5–95% with respect to the exposing light. Best results, however, will be obtained with those copying members and exposing radiation wherein the percent transmission of the copying member to light will lie in the range 50–90%. Further, the percent transmission of the copying member will be chosen so that the intensity of the light required will be a minimum consonant with the achievement of the desired magnetic image. The copying member can be formulated so that 80–100% and even 90–100% demagnetization can be achieved at energy density values at the copying surface no higher than 250 millijoules/cm.$^2$ and generally in the range of 200–400 millijoules/cm.$^2$.

The distribution of the magnetic material should be structured to achieve the desired transmission characteristics. The structuring can be random over the stratum or the magnetic material can be disposed in a substantially regular pattern such as a pattern of dots or preferably lines.

In the case of recording members having randomly disposed magnetic elements, it is advantageous that the hard magnetic working material tends to agglomerate. It is preferred that the working magnetic component in the magnetic stratum of the recording member be nonhomogeneously dispersed in the form of clumps or agglomerates significantly greater in dimensions than the particles of magnetic material. This arrangement improves the transmissivity in the copying member to the exposing light.

The magnetic material is generally bound to the support with a suitable binder, which should preferably be flexible, not thermally sensitive, and possess low heat conductivity. Recording members containing randomly dispersed agglomerates of magnetic material can be made by forming a suspension of the magnetic material in a liquid binder and calendering the suspension over the surface of the support before hardening the binder.

For many uses, particularly in reflex copying of documents, the hard magnetic material is contained in pockets or grooves embossed in the surface of the substrate film in the form of a substantially regular pattern as disclosed in my application Ser. No. 636,955, filed May 8, 1967, where the same fine particle size is desired for the hard magnetic properties, but the individual agglomerates may be up to 25–30 microns or larger if contained in pockets or grooves embossed in the surface of the film.

The pockets or grooves should preferably be at a spacing of from $\frac{1}{100}$ to $\frac{1}{1500}$ inch.

In order to obtain good copies of an original document by forming a magnetic image on a recording member, decorating the magnetic image with toner and transfer of the toned image to a copy paper, the magnetic field of the magnetized portion of the image should be as great as possible. The magnetic field can be improved by increasing the weight of magnetic material present on the recording member while maintaining the desired transparency. The use of indentation filled with magnetic material can be employed to provide the desired weight of magnetic material while retaining the desired transmission to light.

The final thickness of the stratum of the material to be magnetized and the low-heat-conductivity binder when used are not especially critical. For maximum resolution, this stratum should preferably be from 0.01 to 5.0, and most preferably 0.05 to 2.0 mils thick.

The magnetic particles can be aligned with their magnetic axes perpendicular to the plane of the member by forming a stratum of magnetic material in a hardenable liquid binder on the support or in the pockets or grooves, and exposing the member to a magnetic field directed perpendicularly while the binder hardens. The binder can be a solvent coating composition which is hardened by evaporation of the solvent. The binder can also be a thermoplastic material which melts below the Curie temperature of the magnetic material.

Similarly, for parallel orientation, i.e., in the coated direction, the cast coating, whether prepared by solvent or by thermoplastic techniques, before setting, is drawn directly across the pole pieces of a magnet oriented with the field axes thereof in the line of flow of movement of the recording member. Thermosetting binders can also be used.

In addition to permitting the passage of light through the recording member, the structuring aids the formation of a magnetic field corresponding to the magnetization of the recording member. In most methods of reading out the image, the magnetic field rather than the state of magnetization of the recording member is detected.

The structuring of the recording member further aids resolution by limiting thermal diffusion and by limiting remagnetization of the magnetic material cooling from above the lower temperature limit of the Curie point range in the magnetic field of adjacent magnetized particles. For this purpose, the finer the structuring of the recording member the better.

Magnetic prestructuring can also be employed to improve the proportionality of the magnetic field to the magnetization of the recording member and to improve resolution. Magnetic prestructuring of recording members can be achieved by a variety of techniques such as by recording a sine wave or a square wave, on the recording member. It will be apparent that the spatial frequency of the prestructuring, whether physical or magnetic, should be greater than the highest spatial frequency of the information which is to be imaged on the prestructured recording member.

In the process of the present invention the document must be in copying relationship with the recording member. Ordinarily, this relationship is achieved by simply placing the document in contact with the recording member, the face to be copied being in contact, or substantially so, with the magnetic elements of the recording member.

The magnetic image can be decorated with magnetic particles or pigment in the form of inks or toners. Inks contain a particulate magnetic pigment dispersed with wetting agents and the like in a liquid vehicle. Inks are formulated to wick into paper or the like to which the image is transferred from the decorated recording member to form the copy. In toners, the magnetic particles are encapsulated with a fusible coating. These may be employed as powders or they may be suspended in a suitable liquid vehicle to decorate the recording member. After transfer of the toner image to the copy paper the toner is fixed by fusion of the particle coating.

The above process of reading out the magnetic image formed by reflex thermomagnetic recording is particularly useful in copying processes since the image can be read out repeatedly without deterioration in the quality of the copy.

The magnetic image can be read out by any other means which can be employed to detect magnetization including magnetic heads such as are employed in tape recorders, the use of the Kerr or the Faraday effects, electron beam read out, magnetic tape viewers such as those disclosed in U.S. 3,013,206 and the like.

If the magnetic image was formed with the magnetic stratum adjacent to the document, the image will be right reading if viewed through the back, i.e., support side of the copy member. The toner or ink can be transferred from the magnetic recording member to a final recording member, such as white bond paper by direct contact with the uppermost surface of the developed magnetic copy member to transfer the toner or ink image to the paper thereby assuring a right-reading copy of the original as viewed on the transferred surface.

The magnetic gradient produced in a recording member by the reflectivity gradient of the original document is desirably as large as possible. When magnetic toners are employed, a substantial degree of magnetization is essential for toner pickup. However, when more sensitive read-out means are used, such as a magnetic read-out head, electron beam read-out and the like, small magnetic fields can be sensed.

SPECIFIC EMBODIMENTS OF THE INVENTION

The following examples in which the parts given are by weight are submitted to illustrate the invention further, but not to limit it.

EXAMPLE I

Part A—Preparation of $CrO_2$.—A typical preparation, as described in detail in Cox U.S. Patent 3,278,263 of a magnetic $CrO_2$ species involved the precipitation of $Cr_2O_3$ hydrate from a dilute solution of chromium nitrate using dilute ammonium hydroxide solution. The resultant precipitate was removed by filtration and air-dried to an approximate formula $Cr_2O_3 \cdot 9H_2O$. The product was then dehydrated by heating in a muffle furnace at 600° C. for two hours. A blend was then prepared of 2.4 g. of the thus dried $Cr_2O_3$, 3.6 g. of $CrO_3$ crystals, and 1.5 cc. of water, which blend was then sealed in a platinum tube. The tube was then heated at 350° C. under 1000 atmospheres pressure for eight hours. The tube was then cooled, opened, and the resulting $CrO_2$ product removed, washed repeatedly with water on the filter, dried in acetone, and finally pulverized in an agate mortar. The magnetic properties of the thus obtained $CrO_2$ product exhibited a coercivity of ${}_iH_c$ of 370 oersteds; saturation magnetization $\delta_s$ of 82 emu/g. at 4400 oersteds, 25° C.; and a remanence ratio $\delta_r/\delta_s$ of 0.45.

Part B.—Preparation of thin $CrO_2$-containing films.—A 15-part sample of magnetic $CrO_2$, prepared as described in Part A, was ball-milled for 90 hours with 50 parts of 5% by weight solution of high molecular weight polymethyl methacrylate in methyl ethyl ketone along with an additional 88 parts of methyl ethyl ketone to correct the viscosity. After ball-milling, a casting solution was prepared from 51 parts of the resultant $CrO_2$/methyl methacrylate/methyl ethyl ketone mix along with an additional 83.4 parts of the original 5% by weight solution of polymethyl methacrylate in methyl ethyl ketone resulting in a formulation in which the final ratio of $CrO_2$ to polymethyl methacrylate was unity. This casting solution was laid down on 1-mil and 2-mil thick films of a commercially available polyestylene terephthalate at doctor knife settings at 4, 7, and 10 mils to give, after drying, final thicknesses of the $CrO_2$-polymethyl methacrylate formulation of 0.25–0.3, 0.4–0.5, and 0.6–0.7 mil, respectively.

Part C—Reflex imaging with visible development.—A sample of one of the thinnest $CrO_2$/polymethyl methacrylate coatings, prepared as above, was observed optically and was found to consist of small, opaque regions of $CrO_2$ particles about 0.5–5.0 microns in total agglomerate dimensions. The transmission optical density as measured on a Welch Densichron® using white light was 0.22.

The film was magnetized in a field of magnetic strength of 1000 gauss, and the magnetized film was placed (coating side down) in contact with a sheet of white paper containing a black printed image thereon. The reflectance optical density as measured on a Welch Densichron® with white light was 0.06 for the background paper and 1.26 in the image, i.e., printed area of the original. A commercially available electronic photographic flash unit (an Ultrablitz Cornet M flash unit, capacitance of 300 $\mu$f.) was charged to 500 volts and discharged through the back of the topmost sheet of the composite, i.e., the 2-mil transparent polyethylene terephthalate base. The composite was then separated.

The $CrO_2$-containing film was dipped in Visimag® type F, a commercially available powder suspension, which consists of small particles of ferromagnetic material in a hydrocarbon solvent, removed, and then air-dried. The ferromagnetic particles of the suspension were found to adhere selectively to those regions of the $CrO_2$-containing film corresponding to the printed regions, i.e., the image areas, of the original printed film. Thus, there was obtained a right-reading positive image of the original message as seen through the transparent polyester substrate. The $CrO_2$-containing film carrying the Visimag® image was then placed face down, i.e., with the Visimag® image on the bottom against a clear plastic sheet with a pressure-sensitive adhesive to transfer the ferromagnetic black particle image to the adhesive sheet. Simple pressure resulted, when the two films were separated manually, in the transfer of the Visimag® image from the $CrO_2$ film to the plastic adhesive-coated film. The adhesive sheet with the thus transferred ferromagnetic black particle image of the original message was then adhered to white paper to increase contrast. Resolution and fidelity were good. As long as the imaged $CrO_2$ film is not remagnetized, it may be redeveloped by again dipping in the Visimag® suspension of iron particles and transferring the iron particle image to the final copy paper. As many as 50 copies have been made with no loss in quality by this method. The $CrO_2$ film may be completely erased for reuse by remagnetizing.

The imagewise exposure and formation of the right-reading positive image is especially surprising, in that the image is formed by light reflectance rather than as might be expected by planar heat contact. Thus, in the exposure step reading downwardly from the flash tube, there are in order the transparent polyethylene terephthalate film base support, next downwardly the $CrO_2$-containing polymethyl methacrylate layer, and next downwardly the paper original containing thereon a printed black ink image.

When the flash tube is activated, the light goes first through the transparent polyethylene terephthalate film support and, in so doing, is substantially unaltered and substantially unabsorbed. In continuing its downward path, the flashed light next necessarily goes through the polymethyl methacrylate/$CrO_2$ layer. The $CrO_2$, being opaque, absorbs some of the transmitted radiation and, in so absorbing, is heated to some degree. Thus, in its downward path, the flashed light transmitting the $CrO_2$-containing layer thermally biases the magnetized $CrO_2$ towards demagnetization. In continuing its downward path, the flashed light next hits the white background original containing the black printed message and the light is selectively absorbed in the black image areas and selectively reflected from the background or white areas of the original.

The intensity and exposure times of the flashed light are such that the heat buildup arising in the black image areas, by virtue of the absorption of the light therein, is not sufficient to effect enough heat buildup in said areas to transmit backwardly by thermal contact to the $CrO_2$ layer and appreciably alter the magnetic properties of the $CrO_2$ in those areas of that coating corresponding to the areas of the black original image.

On the other hand, the reflectance of the white background areas on the original is sufficiently high so that the transmitted light reaching these areas is reflected backward through the $CrO_2$-containing polymethyl methacrylate layer in sufficient intensity to result, after necessary absorption by the $CrO_2$ particles, in a sufficient heat buildup in the $CrO_2$ particles to raise the material above its relatively low Curie temperature and thereby demagnetize the $CrO_2$ layer in those areas. Thus, surprisingly what is obtained is an image achieved by selective demagnetization by imagewise raising the temperature of the $CrO_2$ layer above the Curie temperature of the premagnetized $CrO_2$ particles, the imagewise demagnetization being achieved by a joint result of thermal bias, transmission, and imagewise reflectance absorption. Thus, the entire imagewise-forming process, while admittedly involving light and operating through absorbed heat, does not depend on, and in fact preferentially avoids, direct thermal transfer via contact which in case of long exposure times (approximately one second) can lead to thermal demagnetization of chromium dioxide adjacent to the black message areas on the original document, thus giving a negative right-reading image when the decorated imaged film is viewed through the substrate side.

EXAMPLE II

A sample of $CrO_2$, prepared as described in general in Example I, Part A, with a saturation magnetization of 75 emu/g. measured at 4400 oersteds at 25° C. was ball-milled in water to break up aggregates, washed, and dried. A coating mixture was prepared by kneading in a polyethylene bag 10 grams of the just described, powdered $CrO_2$, 10 grams of a commercially available, high molecular weight polyvinyl chloride (Goodrich Geon® 101 EP), 2 grams of a commercially available polymeric epoxy plasticizer/stabilizer (Shell's Epon® 812), 5 cc. of cyclohexane, and 15 cc. of tetrahydrofuran. The resultant composition was then milled on a 6" rubber mill using additional tetrahydrofuran to maintain a desirable milling consistency until the $CrO_2$ was completely incorporated into the solvent-plasticized polyvinyl chloride. There was thus obtained a plastic, flexible polymeric sheet weighing 22.5 grams.

This sheet was then dissolved in 75 grams of tetrahydrofuran and the resultant suspension cast on a 1-mil commercially available polyethylene terephthalate film base using a doctor knife setting of 1 mil. The cast film was then air-dried and resulted in a ca. 0.05 mil coating thickness of the dispersed $CrO_2$ on the polyethylene terephthalate film base.

A sample of the just described flexible polyethylene terephthalate film carrying a dispersion of $CrO_2$ in polyvinyl chloride was substantially uniformly magnetized with a 1000 cycle/second signal by passage through a commercially available magnetic tape recorder (an Ampex Model 600). The thus magnetized $CrO_2$-containing tape was placed (coating side down) in contact with a series of printed lines on white paper. The composite was then exposed to the flash from an Ultrablitz Meteor SP electronic flash unit (capacitance, 600 $\mu$f.) charged at 500 volts. After exposure and separation of the original and the $CrO_2$-containing film, it was found that the latter had been imagewise demagnetized by the exposure in the regions of the film corresponding to the white background areas of the original but remained substantially unchanged magnetically in the regions thereof corresponding to the image areas, i.e., the printed lines, in the original. As determined by suitable instrumentation, the amplitude of the signal obtained from the exposed $CrO_2$ film member in the areas thereof corresponding to the background areas of the original was as low as 5 mv.; whereas, the amplitude in the areas of the exposed film corresponding to the image areas of the original was approximately 40 mv.

EXAMPLE III

A printing ink formulation was prepared from 35 grams of a commercial alkyd for printing-ink use (Aroplaz 1271), 65 grams of $CrO_2$ (magnetic properties: coercivity 415 oersteds, saturation magnetization 78.5 emu/g., measured at 4400 oersteds at 25° C., remanence 37.6 emu/g.) 5 grams of a commercially available varnish (No. 00 transparent varnish, Superior Varnish Company), and 0.2 gram of a commercially available lithographic ink drier (Maff paste).

The above was mixed on a three-roll mill operating with 50–100 lbs. front-to-rear roll pressure for four passes over the rolls. The resultant ink was then used on a letterpress to print from a 50% tint 300-line/inch commercially available plastic halftone printing plate (sold under the trademark Dycril®) onto a 5-mil thick film of a commercially available polyethylene terephthalate film (sold under the trademark Mylar®). The resultant ink film was then air-dried resulting in a coating thickness of 0.12 mil, exhibiting a transmission optical density to white light of 0.50 as measured on a Welch Densichron®.

The resultant printed film was magnetized in a 1500 gauss D.C. field and placed in direct contact on top of a printed resolution chart on paper containing 56 lines/inch as the maximum, with the chromium dioxide-bearing surface of the printed film down in contact with the resolution chart. The reflectance optical density of the said resolution chart, again measured on a Welch Densichron® with white light, was 1.28 in the printed, i.e., line, regions, and 0.12 in the background regions. A 10 $\mu$f. capacitor bank was charged to 900 volts and discharged through a General Electric FT 91/L xenon flash lamp housed in a spherical reflector approximately 4" from the surface of the composite sheets. The energy output of the lamp at this same distance was measured as 150 millijoules/cm.$^2$ at the composite film surface.

The film composite was separated and the exposed $CrO_2$-containing film was dipped into a mixture of five grams of Type L carbonyl iron (General Aniline & Film Company) in 200 cc. of trichlorotrifluoroethane. The film was removed from the developing bath and air-dried. Carbonyl iron particles were found to adhere to the film in the regions thereof corresponding to the printed regions of the resolution chart. Thus, the developed iron image on the $CrO^2$-containing face was wrong-reading as viewed from said face but was right-reading as viewed through the transparent support. The 56-line/inch image of the original was clearly readable on the developed film. The $CrO_2$-containing developed film was then placed with the iron-developed image directly in contact with an adhesive-coated white paper with the adhesive coating down, i.e., in contact with the iron image. On mild pressure, the carbonyl iron image was transferred to the paper, thereby resulting in a right-reading image of the resolution chart with good fidelity and resolution. Multiple copies were made by repowdering the imagewise demagnetized film and transferring the resultant iron image as above.

EXAMPLE IV

Effect of thermal biasing

Part A—Prepartion of $CrO_2$ film.—A 4.85% polymethyl methacrylate (PMMA) solution was prepared by dissolving 30 parts high molecular weight heat polymerized polymethyl methacrylate ("Bornelite"®) in 590 parts methyl ethyl ketone. The viscosity of the solution (Brookfield No. 4 spindle, 50 r.p.m.) was 680 centipoises. A dispersion was prepared by ball milling for 125 hours 10 parts of the $CrO_2$ of Example 1, Part A and 103.3 parts of above PMMA solution. This 2/1 $CrO_2$/PMMA dispersion was converted to a 1/5 dispersion by diluting 12.5 parts with 102 parts of the 4.85% PMMA solution. Viscosity of this dispersion (Brookfield No. 4 spindle, 50 r.p.m.) was 620 cps.

A film was cast from the above 1/5 $CrO_2$/PMMA dispersion onto a 2-mil commercially available polyethylene terephthalate film using a doctor knife setting of 3 mils. The resulting film, dried at room temperature, had a transmission optical density (Welch Densichron®) of 0.26 corresponding to a light transmission value of 55% (including 2 mil-film substrate of Mylar®). The coating thickness was 0.2 mil.

Part B.—A capacitor was charged to voltages as indicated in Table I, following, and then triggered to discharge the capacitor through a G.E. FT–91/L flash lamp.

This lamp was located horizontally 4" above a 3" diameter opening in a 7" diameter spherical reflector. The energy stored in the capacitor is given by the formula $$E = \tfrac{1}{2} C V^2$$

The energy density arriving at the 3" diameter opening was measured by means of a Westinghouse laser radiometer, model RN–1. The housing of the radiometer was flush with the 3" diameter opening in the spherical reflector while the window of the radiometer was located ½" below the plane of this opening. The output of the laser radiometer was detected by means of a Keithly, model 149, millimicro voltmeter by means known to those skilled in the art. The resulting energy density in terms of millijoules/cm.$^2$ is tabulated as a function of the capacitance and the voltage in Table I.

TABLE I.—ENERGY DENSITY FROM FT-91 WITH THE 7" SPHERICAL REFLECTOR IN MILLIJOULES-CENTIMETER$_{-2}$

| Capacitance µf. | Voltage 500 | 600 | 700 | 800 | 900 | 1,000 |
|---|---|---|---|---|---|---|
| 5 | 0.56 | 0.86 | 1.25 | 1.76 | 2.39 | 3.14 |
| 10 | 1.45 | 2.23 | 3.15 | 4.30 | 5.69 | 7.28 |
| 20 | 4.43 | 6.5 | 9.2 | 12.8 | 17.2 | 23.0 |
| 40 | 8.5 | 14.0 | 20.8 | 29.0 | 38.3 | 50.6 |
| 60 | 13.5 | 21.7 | 31.5 | 44.0 | 60.0 | 82.0 |
| 80 | 22.0 | 33.3 | 47.0 | 62.8 | 82.0 | 104.5 |
| 100 | 28.5 | 43.3 | 61.0 | 81.8 | 106.0 | 134.7 |
| 120 | 38.8 | 55.0 | 75.0 | 100.0 | 129.5 | 164.0 |
| 140 | 45.0 | 65.5 | 89.8 | 118.0 | 151.2 | 189.2 |
| 160 | 54.0 | 77.4 | 105.0 | 138.0 | 176.8 | 221.0 |
| 180 | | 86.0 | 118.5 | 155.5 | 196.4 | 239.4 |
| 190 | | 89.0 | 126.0 | 167.0 | 211.0 | 256.5 |

A strip of the chromium dioxide coated film of Part A was cut into a ¼" wide strip by 10½" long and formed into a continuous loop 27½" in circumference by splicing with leader tape. This loop was used with a conventional tape recorder (Ampex F–4450). A 700 cycles/second signal was recorded at 3¾" per second tape speed. The tape was removed and placed in contact with a piece of paper (white paper or black paper to simulate white copy bearing black print images) with $CrO_2$ surface of the tape against the paper. The paper was directly in contact with an aluminum platen, heated electrically and controlled at the temperature indicated in Table II following, by a thermocouple embedded in the platen. A vacuum hold-down system was used to keep the paper and the tape in intimate contact with the platen. An opaque mask was used on top of the tape to limit the length along the tape of the area to be exposed. The 3" diameter opening in the spherical reflector containing the G.E. FT–91/L flash tube was then brought into contact with the mask on the backside of the supporting tape. The capacitor was then charged to the voltage indicated in Table II, and then discharged. The tape was next advanced and given a different exposure.

The exposed tape was then repositioned on the Ampex Recorder. The signal was read out (played back) and displayed on a cathode ray tube. The percent reduction in amplitude of signal in the areas which had been exposed to the flash was used as a measure of the average percentage demagnetization that had taken place. This percentage demagnetization and the energy arriving at the surface of the $CrO_2$ film are tabulated in Table II.

Data in Table II illustrate that the energy requirement imposed on the flash lamp may be reduced to approximately one-half the room temperature values at 75° C., one-fifth the room temperature values at 100° C. and one-twentieth the room temperature values at 120° C.

The controlling mensuration is the energy density at film (last column) since the necessary capacitance decreases with increasing temperature. Comparisons should be made between white-white and black-black copy papers. Also comparisons for equivalent exposures should be made with respect to energy densities reported.

In addition to reducing the energy requirements as shown in Table II, thermal biasing gives an improvement in gray scale. The thermal biasing may be applied up to any temperature below the Curie temperature of the particular hard magnetic imaging particles used. Thus, for $CrO_2$, the Curie temperature is near 119° C. This varies somewhat depending on the modifiers used in the synthesis and the strength of the field used to magnetize, but Curie temperatures in the range of 70° C.–170° C. are attainable with modified $CrO_2$. It will be appreciated that the use without thermal biasing of a modified chromium dioxide with a Curie temperature near 70° C. would be approximately equivalent to thermally biasing at about 75° C. the usual chromium dioxide with Curie temperature of 119° C. The particular choice of thermal biasing conditions, of course, will depend on the rate of decay of magnetic properties with increasing temperature for the hard magnetic particles involved, and the temperature limitations imposed by stability of the nonmagnetic binder and transparent supporting member. Thermal biasing may be established by direct contact with a heated platen as in the examples above or by other obvious means.

TABLE II

| temperature | Color of copy paper | Capacitance (ctr) | Voltage | Percent demagnetized | Energy density at film millijoules/cm.$^2$ |
|---|---|---|---|---|---|
| Room | White | 140 | 950 | 96 | 170 |
| | | | 900 | 76 | 151 |
| | | | 850 | 41 | 134 |
| Do | do | 160 | 1,000 | 100 | 221 |
| | | | 900 | 96 | 177 |
| | | | 800 | 26 | 138 |
| Do | do | 140 | 1,000 | 100 | 189 |
| | | | 900 | 65 | 151 |
| | | | 800 | 0 | 118 |
| Do | do | 120 | 1,000 | 88 | 164 |
| | | | 900 | 28 | 130 |
| | | | 800 | 0 | 100 |
| Do | do | 100 | 1,000 | 51 | 135 |
| | | | 900 | 7 | 106 |
| | | | 800 | 0 | 82 |
| Room | Black | 190 | 1,000 | 86 | 257 |
| | | | 950 | 43 | 229 |
| | | | 900 | 20 | 202 |
| Do | do | 180 | 1,000 | 78 | 239 |
| | | | 900 | 14 | 196 |
| Do | do | 160 | 1,000 | 50 | 221 |
| | | | 900 | 9 | 177 |
| | | | 800 | 0 | 138 |
| Do | do | 160 | 1,000 | 59 | 221 |
| | | | 950 | 18 | 198 |
| | | | 900 | 7 | 177 |
| 75° C | White | 40 | 1,000 | 29 | 51 |
| | | 80 | 700 | 0 | 47 |
| | | 120 | 600 | 0 | 55 |
| | | 140 | 600 | 16 | 66 |
| | | 120 | 700 | 63 | 75 |
| | | 100 | 750 | 51 | 71 |
| 75° C | do | 80 | 1,000 | 100 | 104 |
| | | | 900 | 93 | 82 |
| | | | 800 | 50 | 63 |
| 75° C | do | 60 | 1,000 | 87 | 82 |
| | | | 900 | 58 | 60 |
| | | | 800 | 9 | 44 |
| 75° C | Black | 60 | 1,000 | 16 | 82 |
| | | | 900 | 0 | 60 |
| | | | 800 | 0 | 44 |
| 75° C | do | 80 | 1,000 | 68 | 104 |
| | | | 900 | 24 | 82 |
| | | | 800 | 4 | 63 |
| 75° C | do | 100 | 1,000 | 94 | 135 |
| | | | 900 | 59 | 106 |
| | | | 800 | 13 | 83 |
| 75° C | do | 120 | 1,000 | 100 | 164 |
| | | | 900 | 92 | 120 |
| | | | 800 | 41 | 109 |

TABLE II—Continued

| Temperature | Color of copy paper | Capacitance (ctr) | Voltage | Percent demagnetized | Energy density at film millijoules/cm.$^2$ |
|---|---|---|---|---|---|
| 100° C | White | 80 | 600 | 55 | 33 |
| | | 40 | 850 | 60 | 33 |
| | | 40 | 800 | 48 | 29 |
| 100° C | do | 40 | 750 | 23 | 25 |
| | | | 700 | 14 | 21 |
| 100° C | do | 40 | 1,000 | 100 | 51 |
| | | 60 | 800 | 91 | 44 |
| | | 80 | 700 | 88 | 47 |
| 100° C | do | 40 | 1,000 | 95 | 51 |
| | | | 900 | 81 | 38 |
| | | | 800 | 41 | 29 |
| 100° C | do | 20 | 1,000 | 5 | 22 |
| | | | 900 | 0 | 18 |
| | | | 800 | 0 | 13 |
| 100° C | Black | 40 | 1,000 | 64 | 51 |
| | | | 900 | 35 | 38 |
| | | | 890 | 0 | 29 |
| 100° C | do | 60 | 1,000 | 95 | 82 |
| | | | 900 | 82 | 60 |
| | | | 800 | 55 | 44 |
| 100° C | do | 60 | 800 | 39 | 44 |
| | | | 700 | 13 | 35 |
| 110° C | White | 20 | 1,000 | 70 | 22 |
| | | | 900 | 53 | 18 |
| | | | 800 | 19 | 13 |
| 110° C | do | 20 | 800 | 21 | 13 |
| | | | 700 | 10 | 9 |
| | | | 600 | 6 | 6 |
| 110° C | do | 40 | 1,000 | 100 | 51 |
| | | | 900 | 100 | 38 |
| | | | 800 | 94 | 29 |
| 110° C | Black | 40 | 1,000 | 96 | 51 |
| | | | 900 | 84 | 38 |
| | | | 800 | 46 | 29 |
| 110° C | do | 20 | 1,000 | 44 | 22 |
| | | | 900 | 13 | 18 |
| | | | 800 | 6 | 13 |
| 120° C | White | 10 | 1,000 | 80 | 7.3 |
| 120° C | do | 10 | 1,000 | 57 | 7.3 |
| | | | 900 | 45 | 5.7 |
| 120° C | do | 10 | 800 | 29 | 4.4 |
| | | | 700 | 7 | 3.2 |
| | | | 600 | 0 | 2.2 |
| 120° C | do | 20 | 1,000 | 100 | 22 |
| | | | 900 | 95 | 18 |
| | | | 800 | 75 | 13 |
| 120° C | do | 20 | 700 | 62 | 9.2 |
| | | | 600 | 30 | 6.3 |
| 120° C | Black | 20 | 1,000 | 91 | 22 |
| | | | 900 | 80 | 18 |
| | | | 800 | 69 | 13 |
| 120° C | do | 20 | 700 | 19 | 9.2 |
| | | | 600 | 0 | 7.3 |

EXAMPLE V

A 480 line per inch pattern was hot embossed into a 5-mil thick commercially available polycarbonate film from the nickel plate described in Example IX. The embossed film was filled with a thick paste of $CrO_2$ as described in general in Example IX. The $CrO_2$ filled "Lexan" film was magnetized by passing over the pole pieces of a bar magnet of approximately 1500 gauss average field strength. The film was next imagewise demagnetized by reflex imaging against a printed text using multiple flashes about 0.72 second apart of xenon lamp in a reflector operating at 1790 volts and 128 microfarads while both the original and the magnetized copying member were passing in intimate contact over a 5 inch diameter polymethyl methacrylate driven drum, with intimate pressure being maintained by an external polyurethane foam belt, as in FIG. 4. The lamp and reflector were located inside the drum.

The resultant magnetic image was developed with an aqueous slurry containing a magnetic pigment mixture of average particle size 10 microns similar to that of Example VI and composed of 25 percent of a commercially available low melting polyamide resin ("Versamid 930"), 43.8 percent of a commercially available $Fe_3O_4$ (3,000), 29.2 percent of a commercially available carbonyl iron (GS–6), 2 percent of a commercially available carbon black (Raven–30) and 0.4 percent by total weight of a stearamide, which formulation was prepared by spray drying the above ingredients from a 50–50 blend of xylene and n-propanol. The thus developed sheet was washed gently in water to remove toner from the background and air dried.

In another case the imaged $CrO_2$ film was mounted on a rotary drum. Toner was applied to the $CrO_2$ film and excess toner was removed from the background by means of an air knife. The coating of toner on the $CrO_2$ film was transferred to and fused with pressure and heat (150° C.) onto the surface of a standard imaging paper normally used on A. B. Dick duplicators. The imaging paper bearing the fused toner image was placed on an A. B. Dick Litho-offset Duplicator, washed with the prescribed etchant to remove the protective coating and to make the background hydrophilic. Printing was conducted with regular litho ink, offset-blanket, and water roll. The areas to be printed were wet with oil-based ink and the background, kept moist by the hydrophilic surface, was free of ink. The imaging obtained on a good commercial grade of lithopaper gave printing of the text of the original positives showing good resolution and fidelity for all the letters.

EXAMPLE VI

A cured, filled magnetized $CrO_2$ line pattern film as in Example V was reflex-imaged to an original containing representative line text, including both type and graph forms. The image was developed using a machine similar to that shown in FIG. 4 and described hereinabove. The toner employed was a plastic-coated particulate magnetic composition (average size 10 microns) composed of 40% commercially available carbonyl iron (GS–6), 39% of a commercially available iron oxide ($Fe_3O_4$), 20% of a commercially available low melting polyamide (Versamid 930) and 1% of a commercially available carbon black (Raven–30). This toner composition was invented by Joseph P. Hall, Jr. and George J. Young, as described in Ser. No. 769,977, filed Oct. 16, 1968 and assigned to the assignee of this application. The formulation was prepared in the desired particulate form by spray-drying from a 50/50 blend of xylene and n-propanol.

The slurry or dispersion used in the printing machine was prepared by mixing 170 parts of the above toner, 8 parts of a commercially available laboratory detergent, and 400 parts of warm (50° C.) water, which mixture was finely dispersed by 10 minutes of ultrasonic agitation with stirring. Three such dispersions were combined and allowed to settle, and the clear supernatant liquid therefrom decanted to adjust to a total volume corresponding to 700 parts of water. The developer tank of the printing machine was charged with the above slurry (dispersion) after agitation, and reflex films similar to that described in the initial paragraph of this example were used as the printing masters. Thirty-three hundred copies were run off at the rate of 12 per minute, during which time the operating level of the developer slurry was maintained by adding 640 parts of a water dispersion containing 1% of the commercially available laboratory detergent and 4 parts of the undiluted detergent.

The imagewise demagnetized printing film was changed to that described in detail in the first paragraph of this example and printing continued, still at the rate of 12 revolutions per minute. A total of 1800 copies was run off under basically the same operating conditions, during which time the developer slurry (dispersion) was maintained at operating levels by the addition of 360 cc. of a 1% aqueous dispersion of a commercially available laboratory detergent. In addition 3 grams of the detergent in 30 cc. of water was added after 600 copies had been run off. The following tabulation shows the optical density of the printed images of the last 1800 copies as a function of numbers of copies printed versus that of the first:

| | |
|---|---|
| Start | 0.82 |
| 300 | .60 |
| 600 | .54 |
| 900 | .60 |
| 1200 | .57 |
| 1500 | .60 |
| 1800 | .58 |

EXAMPLE VII

A chromium dioxide-filled line film embossed in 5 mil thick commercially available polycarbonate film, G.E.'s Lexan® (480 lines per inch, 0.376 mil deep, 58% transmission) was sprayed with No. 93 sensitizer (4 oz. per gal. of water, Peacock Laboratory, Philadelphia) and rinsed in tap water. The following solutions were prepared using Peacork Lab materials. Concentrated silver solution "A" 16 oz. in 4¾ gal. of water; concentrated silver solution "B" 16 oz. in 4⅞ gal. water; concentrated reducer "C" 16 oz. in 4⅞ gal. water. Solutions A and B were mixed and the mixture fed to one nozzle of a Peacock silver spray gun model P, and spryed one foot away from the film for one minute. Concentrated reducer solution C was simultaneously fed to the second nozzle of this 2-nozzle spray gun. After spraying, the surface of the film was cleaned with a dispersion of 0.3 micron aluminum oxide abrasive in water. This removed silver from the transparent areas of the $CrO_2$-filled Lexan® film but left an adherent silver deposit over the surface of the $CrO_2$-filled grooves. The film was magnetized in a 1200 oe. D.C. field with the silvered side toward the xenon flash lamp and then reflex-exposed to a test pattern on photographic paper having an optical density of 1.44 in the black areas and 0.11 in the white areas using a xenon flashtube mounted in a 7" D integrating sphere. The exposure was at 190 microfarads and 1025 volts. Development of the exposed film with toner slurry as described in Example V afforded an image of excellent quality.

An embossed 5-mil thick Lexan® film having a pattern of 570 lines per inch, 0.37 mil deep, and 0.88 mil wide was sprayed with the Peacock Lab silver solutions as above. The film was then filled with a dispersion of $CrO_2$ in an alkyd binder and allowed to dry overnight. The surface of the cured film was cleaned with 0.3 micron aluminum oxide abrasive dispersed in water to give a transmission optical density for the filled film of 0.29. This film was magnetized in a 1200 oe. D.C. field and reflex-exposed against the test pattern on photographic paper as before at 1100 volts and 190 microfarads. The exposed film was developed with an above toner slurry to give an image of excellent quality.

EXAMPLE VIII

A dispersion of 2 g. of chi-iron carbide $Fe_5C_2$, 0.5 g. of Aroplaz 1271 alkyd resin, and 0.5 g. of Stoddard solvent was ground in a muller under 150-pound load for 300 passes until the mixture appeared smooth and well dispersed. The iron carbide dispersion was used to fill an embossed Lexan® line pattern film (480 lines per inch, 0.376 mils deep and 58% transmission). The filling was done using five passes with a round edge (⅛" radius doctor knife followed by smoothing with a sharp edge doctor knife. The filled film was dried at room temperature for four hours to harden the alkyd binder, and the surface of the film was then cleaned by gentle polishing with 0.3 micron $Al_2O_3$ powder dispersed in water. The final film had a transmission optical density of 0.22. The film was magnetized in a 1200 gauss average field and exposed in contact reflex relation with a test pattern printed on white paper of optical density 0.11 with an optical density in the printed area of 1.44. The exposure was carried out using the G.E. FT 91/L xenon lamp mounted in a 7" diameter spherical reflector with a discharge from 190 µf. condenser charged to 1675 v. The image was developed with a toner slurry as in Example V, and after transfer of the image to copy paper, the optical density of the black image areas was 1.2, and the optical density of the background areas was 0.14.

EXAMPLE IX

A commercially available conversion film (Cronapress®) having an opaque, porous-coalescible or opaque, pressure-clarifiable (OPC coating 0.4 mil thick on a 5-mil oriented polyethylene terephthalate support film) was carefully cleaned and wrapped on a 4" diameter metal mandrel with vacuum holddown holes in the edges thereof fitted on a precision lathe. The mandrel was evacuated thereby holding the polyester film firmly in place on its surface and a rotary tool was used to collapse a narrow groove in the soft pressure-clarifiable coating down to the interface with the polyester substrate. The rotary tool had a cutting edge hand-honed from a 0.025" thick tool-steel blade tapered to a 0.0003" land at its tip. This rotary tool was advanced by the lead screw on the lathe to cut 480 lines per inch in the OPC film using ethanol as a film/cutting lubricant operating under a protective dust cover.

An electroless copper layer was then deposited on the thus scribed Cronapress® film surface using a commercially available copperplating system. The scribed film was first placed in a flat tray with the soft coating side up for one minute in a solution of 40 cc. of Enplate® 432 in 600 cc. of distilled water. The thus treated scribed plate was then gently rinsed in distilled water and immersed for three minutes in a solution of 40 cc. of Enplate® 440 in 600 cc. of distilled water, followed by another rinse in distilled water, and finally immersed for 15 minutes in a solution of 80 cc. of Enthone Cu 400A, 200 cc. of Enthone Cu 400B, and 360 cc. of distilled water. A copperplating approximately 15 microinches thick was thus formed on the surface of the film. The thus copperplated film was further plated in a commercial nickel-plating bath operating at 110° F. at 1.50 volts for 18 hours to give a nickel plate 14 mils thick.

The scribed Cronapress® film was stripped from the copper layer and the electroless copper layer was next removed from the nickel plate with a dilute aqueous chromic acid (4 oz. per gal.)-sulfuric acid (0.4 oz. per gal.) solution.

A 15" x 16" section of a commercially available flame-treated polyethylene terephthalate film (Mylar® 500A) was backcoated to prevent curling with a 0.4 micron thick coating of a commercially available polyether urethane finish (Imron® RK801) (consisting of a 45% by weight solids solution in 3 parts toluene, 2 parts xylene, and one part Cellosolve acetate of 1.0 mole polypropylene glycol of molecular weight 1025, 1.22 moles of trimethylolpropane, 5.21 moles of a mixture of 2.4- and 2,6-toluene diisocyanates, and 0.3 weight percent of dimethyldodecylamine catalyst) applied at 5/1 weight ratio acetone/RK801 solution from a 10" wide hopper coater having a ⅛" wide slit covered with Whatman No. 1 filter paper and a fine mesh nylon bolting cloth. This backcoating was allowed to air-cure overnight and while preventing curling of the final film, it should be pointed out, is not necessary. The other side of the thus backcoated film was then coated with the same Imron® RK801 syrup at 45 weight percent solids using a doctor knife setting at 15 mils. The coating was allowed to cure at room temperature 16½ hours until it was tack free and approximately 3 mils thick.

The above-described nickel line plate was used to emboss the 3-mil thick Imron® coating at 125° C. for five minutes at 625 p.s.i. On the following day the embossed film was filled with a thick paste made by ink milling 80 parts of $CrO_2$ and 20 parts of a commercial, curable alkyd binder (Aroplaz® 1271) milled 40 passes on a three-roll ink mill. During milling and coating, the $CrO_2$ alkyd dispersion was diluted with Stoddard solvent so that at the time of coating the viscosity was approximately 60,000 centipoises. The embossed Imron® film was taped down to a clean, smooth work area (a ¼" thick gum rubber pad covered by 5-mil Mylar®) for the filling operation. The filling was carried out by placing a bead of the $CrO_2$/alkyd/Stoddard solvent ink-milled dispersion in front of a ⅛" radius steel doctor knife. The doctor knife was held at an angle of 30–35° and was drawn over the area to be coated in a single continuous operation. Several more passes with the doctor knife were then made in rapid succession as the Stoddard solvent evaporated. This took about 30 seconds of elapsed time. A final pass with a sharp edge knife was used to remove most of the excess dispersion from the surface. The alkyd binder was allowed to cure at room temperature overnight. Excess $CrO_2$ and alkyd binder were cleaned from the surface of the film by gentle abrasion with 0.3 micron aluminum oxide particles dispersed in water.

The $CrO_2$-filled film was next topcoated with approximately 0.4 micron of the Imron® RK801 polyether urethane exactly as described for the original backside coating above. The final filled film contained approximately 3.27 grams of $CrO_2$ and alkyd binder per square meter. This film was used to make reflex exposures that were developed by aqueous toner dispersions to give excellent copies of the originals as described in previous examples.

EXAMPLE X

A commercially available vinyl chloride copolymer film from Transilwrap Company, Philadelphia, Pa., was wrapped on the mandrel of a precision lathe as described in the preceding example. The rotary tool described previously was used to scribe 570 lines per inch in the surface of this film by exactly the same technique but with higher pressure as described for the Cronapress® coating previously. The scribed film was replicated in metal exactly as described for the Cronapress® OPC film. The resulting nickel line master was used to prepare an Imron® film as in Example IX above with the following exceptions: A 30" x 15" section of the flame-treated polyethylene terephthalate was used, and the Imron® coating to be embossed was made from the RK801 syrup, 45 weight percent solids, using a doctor knife setting of 11 mils. Embossing, filling, and topcoating steps were exactly as described previously. The final filled film contained 5.8 g. of $CrO_2$ and alkyd binder per square meter. This film was also used to make reflex exposures from opaque originals and the magnetic images were developed with aqueous toner slurries and transferred to final copy paper as in previous examples. Black areas of the final copies ranged in optical density from 1.1 to as much as 1.3; nonimaged areas ranged from 0.11–0.14.

The embodiments of the invention in which an exclusive property or privilege is claimed are defined as follows:

1. A process of reflex thermomagnetic recording which comprises:

(i) premagnetizing a magnetic recording member, said magnetic recording member having a support transparent to light and finely particulate hard magnetic material opaque to said light dispersed in discrete areas bound to said support to provide a transmission to light of said magnetic recording member between 5% and 95%;

(ii) placing a document in copying relationship with said member;

(iii) exposing the face of the magnetized recording member away from said document to light so that each portion of said recording member is exposed to said light for a time less than 10 milliseconds;

(iv) transiently and selectively heating the hard magnetic material in each discrete area to a temperature below the lower limit of the Curie temperature range of the hard magnetic material by absorption of said light;

(v) further transiently and selectively heating said hard magnetic material by light passing through said recording member and reflected from said document whereby the discrete areas having hard magnetic material bound thereto are imagewise heated into the Curie temperature range to imagewise demagnetize the magnetic recording member; and (vi) rapidly cooling the heated hard magnetic material by thermal conduction to said support to fix the magnetic image.

2. Process of claim 1 in which said hard magnetic material has a Curie temperature of 25° C. to 500° C.

3. Process of claim 2 in which said hard magnetic material is chromium dioxide.

4. Process of claim 3 which comprises the additional step of reading out the magnetic image on the recording member by decorating with magnetic particles.

5. Process of claim 4 in which the magnetic particles are then transferred from the recording member to a copy paper.

6. Process of claim 5 in which the read out step is repeated a plurality of times.

7. Process of claim 5 in which the magnetic particles are toner particles having a fusible coating, and the toner particles are fixed to the copy paper by fusion of the fusible coating.

8. Process of claim 7 in which the read out step is repeated a plurality of times.

9. Process of claim 1 in which a flash of light is applied to the recording member.

10. Process of claim 9 in which said hard magnetic material has a Curie temperature of 25° C. to 500° C.

11. Process of claim 10 in which the hard magnetic material is chromium dioxide.

12. Process of claim 11 which comprises the additional step of reading out the magnetic image on the recording member by decorating with magnetic particles.

13. Process of claim 12 in which the magnetic particles are then transferred from the recording member to a copy paper.

14. Process of claim 13 in which the read out step is repeated a plurality of times.

15. Process of claim 13 in which the magnetic particles are toner particles having a fusible coating, and the toner particles are fixed to the copy paper by fusion of the fusible coating.

16. Process of claim 15 in which the read out step is repeated a plurality of times.

References Cited

UNITED STATES PATENTS

| | | | |
|---|---|---|---|
| 2,793,135 | 5/1957 | Sims et al. | 346—74 |
| 2,917,385 | 12/1959 | Byrne | 346—74X |
| 3,250,636 | 5/1966 | Wilferth | 346—74X |

BERNARD KONICK, Primary Examiner

G. M. HOFFMAN, Assistant Examiner